Figure 1:
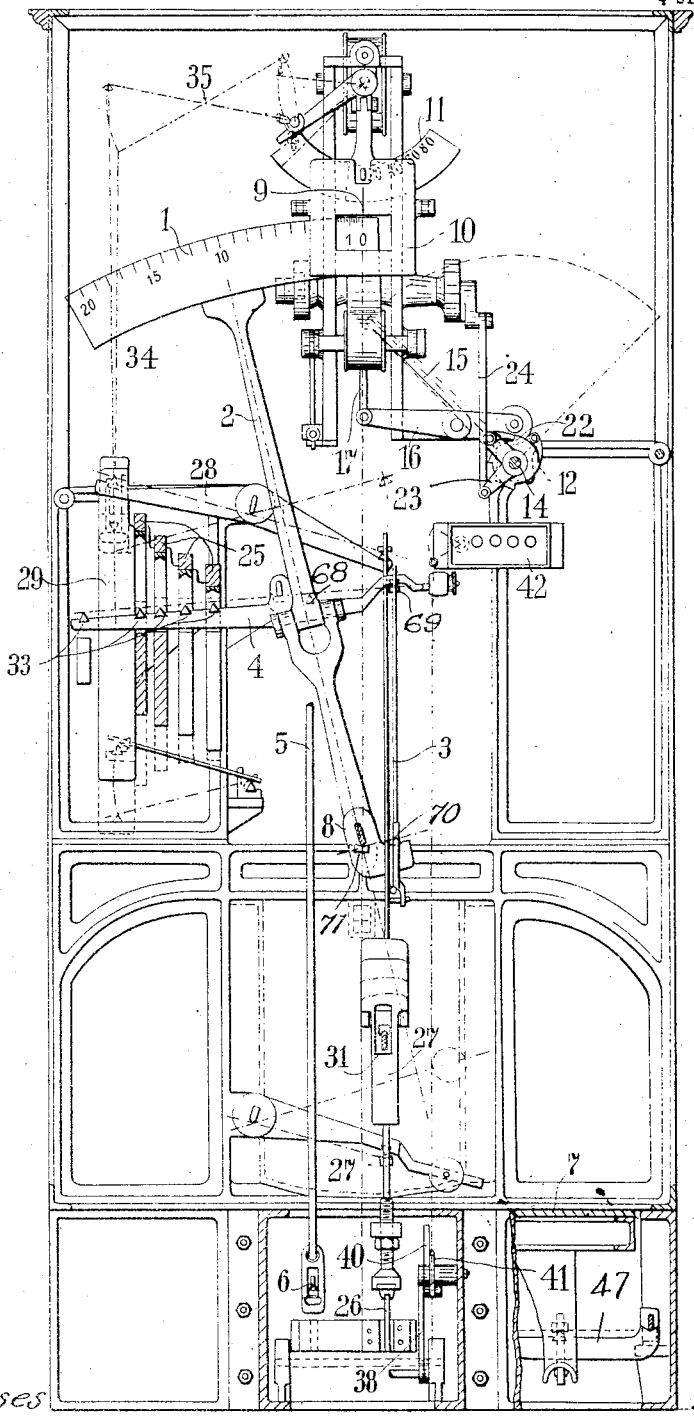

A. MICHEL.
WEIGHING MACHINE.
APPLICATION FILED NOV. 4, 1905.

997,203.

Patented July 4, 1911

4 SHEETS—SHEET 1.

A. MICHEL.
WEIGHING MACHINE.
APPLICATION FILED NOV. 4, 1905.
997,203.
Patented July 4, 1911.
4 SHEETS—SHEET 2.
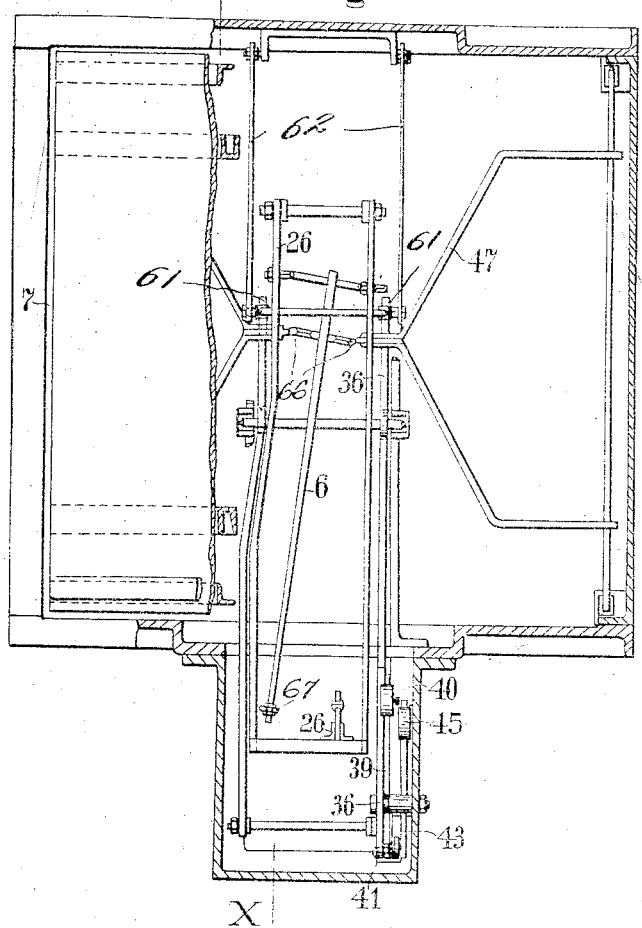
Fig. 3
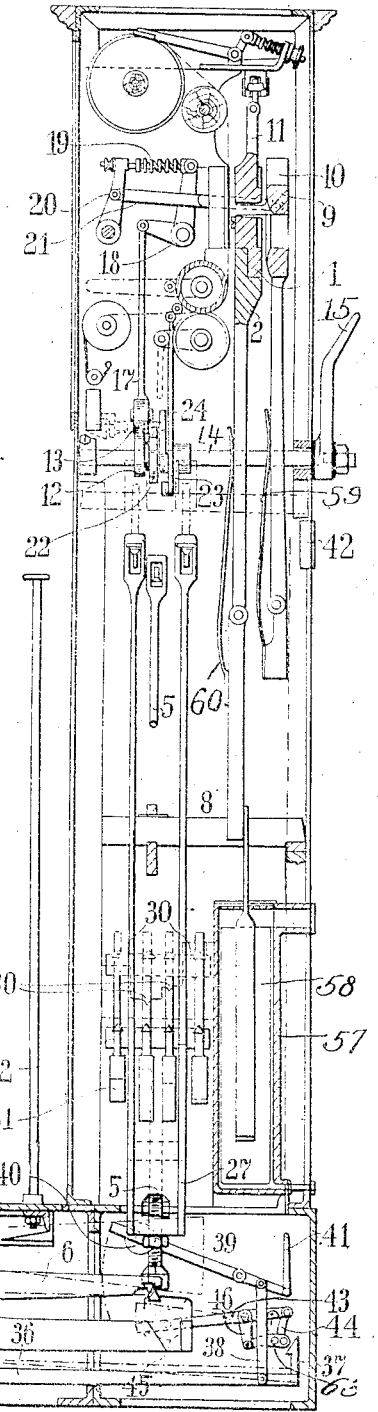
Fig. 2
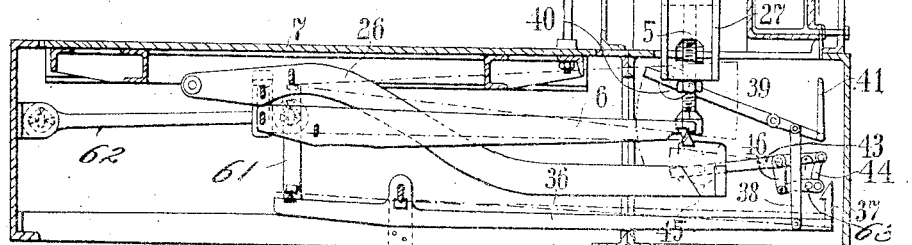
Witnesses:
Inventor
Anton Michel

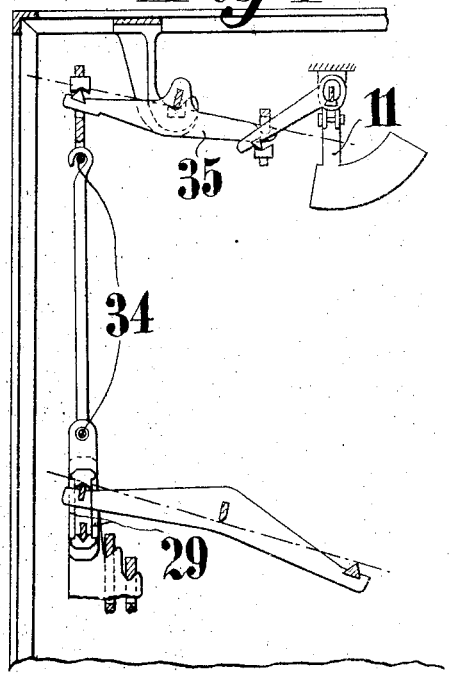
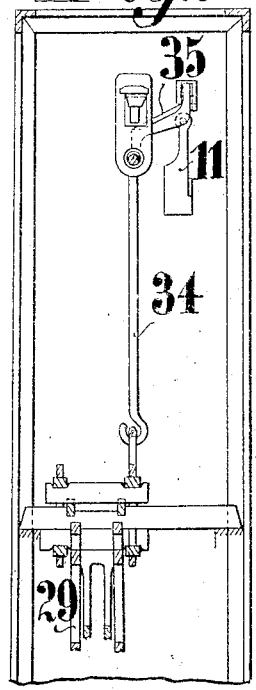
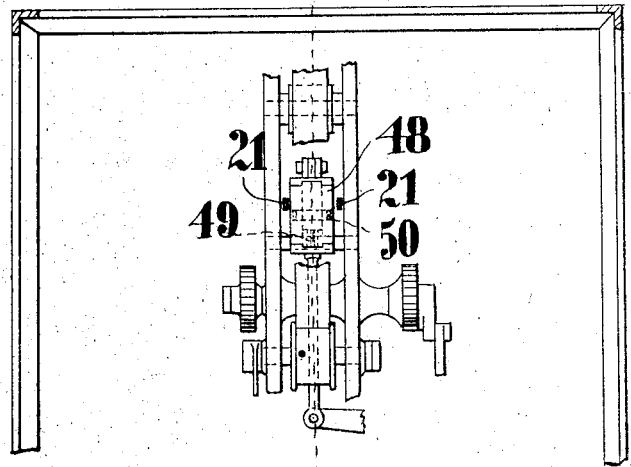
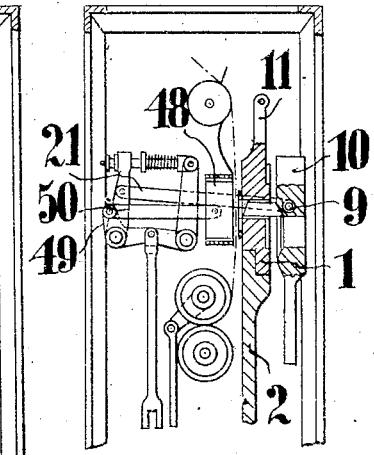

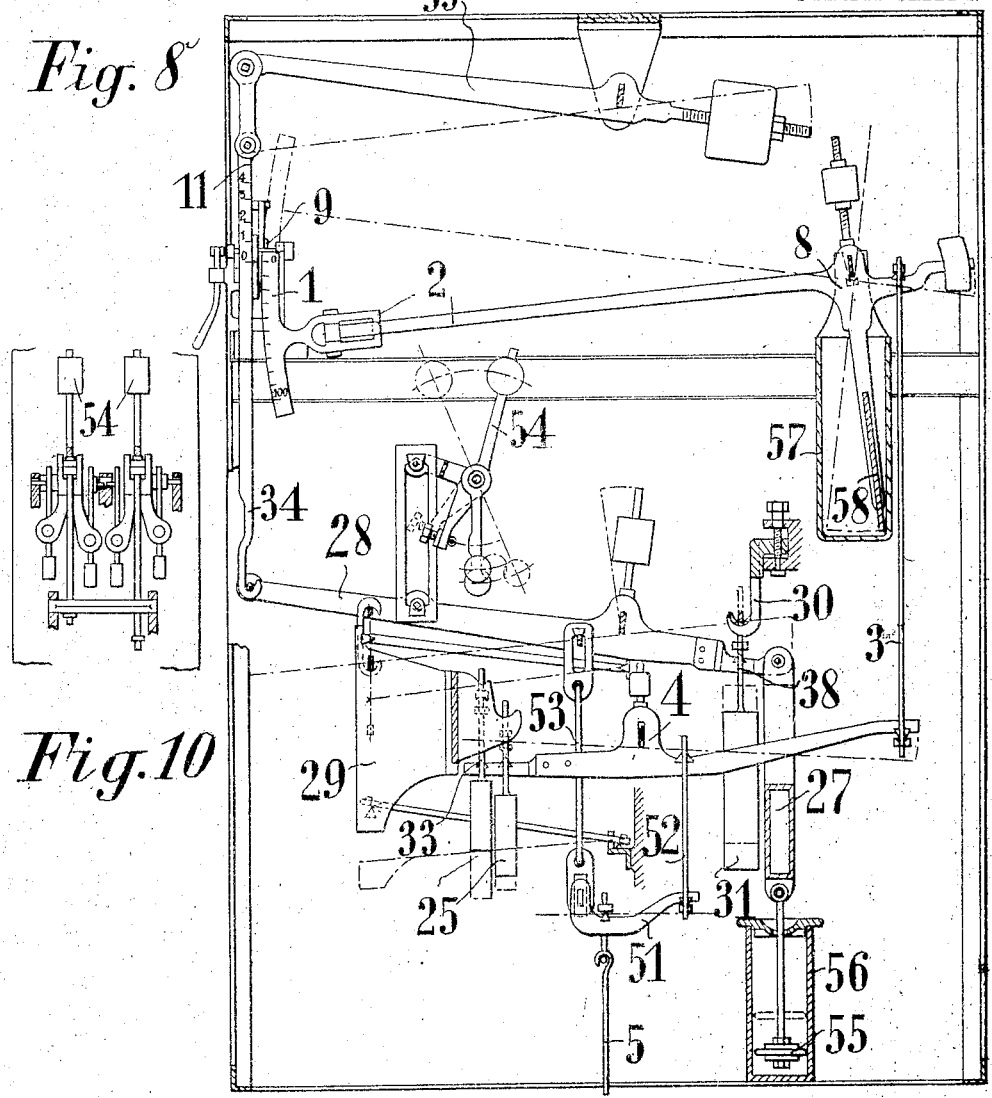

UNITED STATES PATENT OFFICE.

ANTON MICHEL, OF VIENNA, AUSTRIA-HUNGARY, ASSIGNOR OF ONE-HALF TO THE FIRM OF C. SCHOMBER & SÖHNE, OF VIENNA-ATZGERSDORF, AUSTRIA-HUNGARY.

WEIGHING-MACHINE.

997,203.

Specification of Letters Patent. Patented July 4, 1911.

Application filed November 4, 1905. Serial No. 285,878.

*To all whom it may concern:*

Be it known that I, ANTON MICHEL, a subject of the Emperor of Austria-Hungary, residing at Vienna, Austria-Hungary, have invented certain new and useful Improvements in Weighing-Machines, of which the following is a specification.

This invention consists in a weighing apparatus with a scale, the weighing capacity of which is enlarged as desired by the hanging on of suspension-weights, the value of each of which corresponds to that of the maximum graduation of the scale, which weights come into action in a constant sequence on a separate auxiliary beam, the said weighing apparatus also having oscillating scales and a stationary pointer arranged in such a manner that the results of the weighings can be directly read off and printed; the said apparatus also comprises a device for automatically counting the number of times the weighbridge is loaded.

The weighing apparatus comprises two devices: On the one side there is arranged a quadrant balance with a swinging scale, the center of gravity of which is so positioned that the action executed on the latter by the weight on the weighing bridge moves the scale corresponding to this effect of load until the end of the scale is reached. For larger loads which exceed the range of the maximum value indicated on the scale, the second part of the weighing apparatus comes into operation, which consists of an auxiliary beam with suspension weights, which are suspended on the auxiliary beam corresponding to the effect of load exerted on the weighing bridge for the purpose of unburdening the scale of the quadrant balance, as soon as the extent of the scale of the quadrant balance does not suffice in relation to the effect of load exerted on the weighing bridge. This auxiliary beam is inserted in the lever arrangement which transfers the effect of load exerted upon the weighing bridge to the quadrant balance so that this auxiliary beam must continually participate in the motion of the quadrant balance. When a counterweight is suspended on the auxiliary beam, so as to act in opposition to the effect of load exerted upon the weighing bridge, then the effect of load exerted upon the weighing bridge when transferred to the quadrant balance, will be diminished by the weight value of this counter-weight and the balance shows on its scale only that weight value which exceeds the weight value of the counter-weight suspended on the auxiliary beam. The more weights are suspended on the auxiliary beam, so much the more can be weighed with this weighing apparatus. For an easier survey the suspension weights are generally made to equal the round weight values of the scale of the quadrant balance. If for example the scale of the balance corresponds to a weight on the weighing bridge of 200 kg. or somewhat more, then the suspension weights correspond exactly to the weight value of 200 kg. on the weighing bridge. If now three suspension weights are being suspended on the auxiliary beam and the scale of the balance shows 155 kg., then the weight on the weighing bridge amounts to $3 \times 200 + 155 = 755$ kg. The suspension weights can be suspended now in any manner; the weighing apparatus according to the present application shows, however, the manner in which the suspension weights can be automatically suspended on or removed from the auxiliary beam by the effect of the load exerted on the weighing bridge.

One form of construction of the improved weighing machine is shown in the accompanying drawings.

Figure 1 is an elevation of the weighing machine with the front wall removed. Fig. 2 is a corresponding vertical section on the line X X, Fig. 3. Fig. 3 is a plan. Fig. 4 is a sectional elevation of a portion of the mechanism. Fig. 5 is a sectional elevation of the mechanism shown by Fig. 4 in a plane at right angles to the latter. Fig. 6 is a top plan view, partially in section, of another portion of the mechanism. Fig. 7 is a section on the line 7—7, Fig. 6. Figs. 8, 9 and 10 are, respectively, a sectional elevation, a sectional plan and a sectional detail of a modified form for automatically suspending the weights.

The scale 1 is fastened to an arm 2, which can be moved in any desired manner by the effect of a load on suitable balance-mechanism; in the form of construction shown, it is moved through the rod 3 by means of the auxiliary beam 4, which connects the link 5 with the transfer-lever 6 beneath the weighbridge 7 and transmits the effect of the load to the inclined beam 8 on which the arm 2 is mounted; consequently the scale 1 moves in accordance with the effect of this load and takes up a corresponding position.

The transmission of the effect of the load from the weigh-bridge 7 is performed in the usual manner by means of knife-edges carried by the levers 47 upon which the weigh-bridge is resting. The levers 47 which are fork-shaped also have at their single ends knife-edges which are connected with the knife-edges 66 of the transfer-lever 6 in the usual manner by means of suspension members. A part of the effect of the load upon the knife-edges 66 is transferred to the knife-edge 67 of the lever 6, the latter being connected by means of ordinary suspension members with the link 5 which transfers, by means of an ordinary suspension member, the effect of the load imparted to the same to the knife-edge 68 of the beam 4.

On an extension of the beam 4 is arranged a knife-edge 69 directed downward, and from this knife-edge the rod 3 descends to the knife-edge 70 of the inclined beam 8. To an extension of this beam 8 is linked the arm 2 with the scale 1 and the said beam 8 moves upon the knife-edge 71.

The arm 2 with the scale 1 oscillates in conjunction with the inclined beam 8 on either side of a vertical middle plane in which the axis of oscillation of the inclined beam comes to lie, this arrangement being particularly advantageous in this construction of the weighing machine, however, to suit different circumstances, any desired direction can be chosen relatively to the plane of oscillation of the arm 2 and to the middle plane of oscillation.

In the middle plane of oscillation opposite to the scale 1 is arranged the pointer 9, which is fixed relatively to the direction of oscillation, but must be movable to some extent perpendicularly to this, for the purpose of printing the result of the weighing. For the same purpose, this must also be the case with the scale 1.

For weighings which go beyond the range of the scale I employ the auxiliary beam 4, which is provided with knife-edges arranged in a plane passing through the center of gravity of the said beam (see the broken line in Fig. 1 of the drawing), the axis of oscillation of the said beam also passing through the center of gravity thereof. By this means the auxiliary beam 4 is in equilibrium in any position.

In the knife-edges 33 of the auxiliary beam 4 are suspended the suspension-weights 25 which correspond each to the weight-value of the maximum graduation marked on the scale 1 and are of such number as to correspond to the load of the weigh-bridge for the time being and a scale 11 is provided in order to enable these weight-values (depending on the number of such weights suspended on said beam) to be simultaneously read off and printed. The number of these suspension-weights is according to the size of the weighing capacity of the weighing machine and the extent of the scale 1.

If loads up to 1000 kg. are to be weighed on a weighing machine with an accuracy to 1 kg., the scale 1 can be employed with 200 parts to 1 kg.=200 kg. and four suspension weights 25 of 200 kg. each. But if an accuracy of 0.5 kg. is required, the scale 1 can have 200 parts to 0.5 kg.=100 kg. and nine suspension weights 25 of 100 kg. each.

The suspension weights 25 can, in accordance with the space provided, be employed on the one arm of the auxiliary beam 4, as in Fig. 1, and disposed in parallel relation in one series, or the said weights may be arranged in two rows, as represented in Fig. 9, or if the arms or beams be increased, the weights will be correspondingly increased and similarly arranged in rows. In Fig. 9 four weights 25 are shown in two rows disposed upon a fork arm of the auxiliary lever 4. These suspension weights 25 are always employed and arranged in accordance with a determined sequence of series or in a manner similar to the arrangement shown in the drawings.

A common guide-frame 29 is provided for the suspension-weights 25, which frame is moved by means of the lever 28 by which motion the suspension-weights 25 are successively let down onto or raised from the corresponding knife-edges 33 on the auxiliary beam 4, as required. The suspension weights 25 are so suspended in the guide frame 29 and the degree of this frame is so measured that the auxiliary beam 4 (which must always make a stroke corresponding to the motion of the scale 1 independently of the suspension weights 25) touches none of the suspension weights 25 on the auxiliary beam 4, which should not come in operation.

For loads which do not exceed the compass of the scale 1, no suspension weight 25 is needed for operation and the motion of the scale 1 and of the auxiliary beam 4 is entirely free.

For loads up to the double weight value of the scale 1, the first suspension weight 25 comes to be suspended on the auxiliary beam 4 by means of the downward motion of the frame 29 whereby the beam 4 and the scale 1 are moved to a distance until the suspension weight 25, together with the scale 1, is balanced by the load. During this operation, the motion of the guide frame 29 goes so far that the auxiliary beam 4 can perform its entire motion and the suspension weight 25 operating thereon can neither come in contact with the frame 29, nor the next succeeding suspension weight 25 with the auxiliary beam 4. For the maintenance of this limit a stop device (in the present drawings a weight 31) is used for each suspension weight 25, the resistance of this device being overcome by the increasing loading of the weighbridge, so that the next suspension weight 25 comes to act on the auxiliary beam 4 by the further motion of the frame 29 in the same manner as the previous one. So the operation goes on until the last suspension weight 25 comes to act on the auxiliary beam 4.

By means of the link 34 and lever 35, Figs. 4 and 5, connecting the frame 29 to the scale 11, the latter is set in accordance with the suspension weights 25 coming into action on the auxiliary beam 4, said link and lever, for the purpose of clearness, being shown in dotted lines in Fig. 1. In the present form of construction of this weighing apparatus, the application to and removal of the suspension weights 25 from the auxiliary beam 4 takes place automatically by the action of the load on the weighbridge 7, which acts by means of the levers 47 on the transfer-lever 6. The bearing or support of the transfer-lever 6 is suspended on the short arm of lever 26 which acts at its other end on the linkwork 27 so as to press the same upward when the weighbridge 7 is loaded, and this loading action, by reason of the method of supporting the transfer-lever 6, is partly transferred to the lever 26.

The bearing 61 of the rotary axis of the lever 26 rests upon the lever 36 and is guided through the medium of rods 62 in order to prevent sidewise movements. The object of this movable bearing of lever 26 is to actuate the load on the weighbridge without influencing the results of the counting device which automatically counts the single weighings, as will be more fully hereinafter explained. If this counting device is not used or arranged on the scales, the bearing of the lever 26 need not be movable, but fixed, as the lever 36 is omitted and the operation of the lever 26 does not influence the action of the counterweight 25 because the action of the said weight is controlled or ensues from the short end of the transferring lever 6 which, acting upon the short arm of the lever 26 in consequence of the limited movement permitted the bearing 61 resting upon lever 36, transmits its movement equally strong to the long arm of lever 26, which pressing upwardly engages the linkwork 27, while on the lever 36 only the greater pressure caused through the weight on the weighbridge 7 and exercised through the transmission of the levers 47 and 6 upon the bearing 61 of the lever 26 is utilized and which is lost without any useful effect if the said bearing 61 is fixed.

The linkwork 27 is suspended on one end of the lever 28, to the other end of which is suspended the frame 29 with the suspension weights 25, so that the upward motion of the lever 26 causes the downward motion of the frame 29 with the suspension weights 25. Since, however, this motion of the frame 29 with the suspension weights 25 should only take place when the end of the scale 1 is reached by the loading of the weighbridge 7, weights 31 are suspended near the linkwork 27 on fixed carriers 30 in such a manner that they are taken up successively by the linkwork 27 by means of the carrier 32, when the loading of the weighbridge 7 reaches the limit of the scale 1, which takes place in the following manner: Assuming that the scale 1 be one reading up to 200 kilograms and consequently the suspension-weights 25 are also each adjusted to the weight-value of 200 kilograms. When the loading of the weighbridge 7 has reached 200 kilograms, the linkwork 27 is raised by the lever 26 until the carrier 32 mounted on the linkwork 27 comes to that weight 31 which it first reaches. This motion corresponds to that motion which is necessary to depress the frame 29 far enough for the first suspension-weight 25 to seat itself on the first knife-edge 33 of the auxiliary beam 4 and the latter can freely play. The suspension weight 25 discharges the pressure operation of the load on the scale 1 for a value of 200 kg., which value is shown on the scale 11, and the scale 1 shows only the excess of the load over 200 kg.

When the loading of the weighbridge 7 does not much exceed 200 kilograms, the scale 1 goes back to the corresponding point. If, however, the loading of the weighbridge 7 has reached 400 kilograms, the lever 26, through lifting with it the next weight 31, will be moved until the carrier 32 comes to the second weight 31 and so on, in which operation the next suspension-weight 25 always comes into action on the corresponding knife-edge 33 of the auxiliary beam 4.

When the weight of the load on the weighbridge 7 is less and the initial limit of the scale 1 is reached the lever 26 also goes back. The linkwork 27, loaded by the weight 31, goes back until the corresponding number of weights 31 is again received by the fixed carrier 30 and the corresponding number of suspension-weights 25 is lifted off from the auxiliary beam 4 by the upward motion of the frame 29.

On the indicator 9, a vernier scale can also be mounted, whereby one is in a position to read with certainty small fractions of the scale 1 and to print the same.

For the purpose of printing the results of the weighing, the scale 11 must also be movable to some extent in the direction in which printing takes place and the rear sides of the scale and pointer are then made accordingly, in order to enable the results of the weighing to be printed on cards or strips by means of the printing frame 10 which can be pressed in any desired manner against the scale and pointer.

In the form of construction shown, the printing frame 10 is in front of the scale and pointer and is provided with a suitable window-shaped opening to enable the results to be read off; but the printing frame 10 can also be arranged behind the scales and the pointer, as is represented in Figs. 6 and 7, in which case the frame 10 moves only relative to the scales and the pointer, while the piece 48 which in the arrangement previously described is rigid, is simultaneously moved by means of an angle lever 49 and strut 50 and presses the cards or strips against the scales and pointer. The flat springs 59, 60 on printing frame 10 and on the arm 2 of the scale serve for the releasing of these parts after printing the results of the weighings, so that the play of the beam and scales is not disturbed. The fixed pointer 9, in accordance with the construction shown by Figs. 1 and 7, is represented on the front side of the printing frame by an engraved line or arrow; on the rear where the results of the weighings are printed the pointer 9 is engraved as an arrow and as a stamp adjusted to the printing frame in such manner that the arrow prints itself during the printing with the vernier scale. In the embodiment of the invention according to Figs. 8 and 9, the pointer is elastically adjusted either to the rear printing plate 48 or to the frame so that it cannot change its position relatively to the vernier scale but has yielding movement to adapt it to printing. This arrangement for printing with an oscillating scale and fixed pointer has the special advantage that by this means narrow cards or strips can be employed, since it is sufficient to print on a small part of the scale and this arrangement is much more easily to be examined than with weighing machines having an oscillating pointer and a fixed scale, where the whole arc or range of oscillation must be printed; on the other hand, since the scale and pointer are used directly for reading off and printing, very many mistakes which would otherwise occur are avoided and greater accuracy is attained.

In the present form of construction the ratchet wheel 12, which is provided with four cogs, is loosely mounted on the shaft 14 and which is moved through the medium of the lever 15 only by means of the carrier 13 on the shaft 14. The carrier 13 is provided with a sliding disk or cog which engages one cog at a time of the cog wheel 22 rigidly connected with the ratchet wheel 12 and moves with each engagement of the ratchet wheel 12 one cog, whereby the lever 16 resting by means of a roll upon the ratchet wheel 12 is moved. Lever 16 transfers by means of the connecting rod 17 movement to an angle lever 18. This latter transfers movement to the arm 20 owing to the spring connection 19 between said arm 20 and the lever 18. Motion is transmitted from the arm 20 to a connecting rod 21 attached to the printing frame 10, so that this latter will then print a record of the result. The introduction of the spring 19 enables the pressure to be regulated to a definite value. To the ratchet wheel 12 is rigidly connected the toothed wheel 22 with which the carrier 13 engages. Near the carrier 13 is also arranged the carrier 23 which, by means of the rod 24, is used for feeding forward the strip on which the results of weighing are printed. Moreover, on the improved weighing machine an arrangement is provided for automatically counting the number of times the weighbridge 7 is loaded, for the purpose of checking whether all weighings have been registered. The described apparatus comprises also the vertical, somewhat movable arrangement for supporting the lever 26 which acts on the lever 36, the lever 36 with the hook 37, the connecting rod 38, the lever 39 with the counterweight 40, the connecting rod 41, and the counting apparatus 42. The latter mechanism also includes the lever 43 with the hook 44 and the counterweight 45.

A counting apparatus is not shown for the reason that any suitable construction which can be actuated by the oscillatory or reciprocatory movement of the connecting rod 41 can be employed, so, under such circumstances, it is thought unnecessary to show such form of mechanism.

By the action of the load lying on the weighbridge 7 upon the movable support of the transfer lever 6 and consequently upon the movable support of the lever 26, the lever 36 is somewhat depressed at this end and thereby raised at the other end, in which motion the connecting rod 38 with the lever 39 and the connecting rod 41 must also take part and lift up the arm on the counting apparatus 42, whereby half of the necessary motion at the counting apparatus is completed. Through the medium of connecting rod 38 extending from lever 36 to lever 39, together with the counterweight 40, this mechanism is so regulated by the said counterweight that the said counting apparatus 42 is operated only when a predetermined weight on the weighbridge is exceeded. The second half of the motion then takes place during the return of the lever 36 and of the parts connected thereto. In order, however, that this motion shall not take place immediately if the load on the weighbridge is somewhat reduced, in which case it might occur that one and the same load would be counted several times, the lever 43 with the hook 44 and the weight 45 are provided in order that it shall only take place when the load is entirely removed from the weighbridge 7. When the lever 36 is caused to rise by the weight on the weighbridge 7 the hook 37 of said lever engages the hook 44 movably secured to the lever 43. When the weighbridge 7 is not loaded, the counterweight 45 on the lever 43 exerts a downward movement on the hook 37, so that the pulling action of the lever 36, which was neutralized through the weight on the weighbridge, causes a drawing stress on the hook 44 through the said hook 37, whereby the lever 43 yielding to this pull inclines to a certain extent and the fixed arm 46 secured to the lever 43 disengages the hook 44 from the hook 37 through the medium of the movable rod 63, and the said hook 37 with the lever 36 moves downwardly and the connecting rod 38 actuates the counting apparatus 42. By means of the lever 39, the small motion of the lever 36 is suitably enlarged; by means of the lever 43 the counting more than once of a load on the weighbridge 7 is prevented and adjustment is effected by the weights 40 and 45.

The automatic arrangement for the suspension weights 25 can be constructed in such manner that the link-work 27 is not moved directly by the lever 26, and instead of the weights 31 on the link-work 27 there can also be employed other weights in a different arrangement, as well as tilting weights which assure a suitable action upon lever 28, as is represented in Figs. 8, 9 and 10. Instead of the lever 26 below the weighbridge, the lever 51 is attached to the connecting rod 5, which transmits the effect of the load from the weighbridge 7 by means of levers 47 and 6 to the weighing mechanism. The axis of rotation of lever 51 is suspended by the hanging link 53 on lever 28, whereby the action of the link-work 27 is partly compensated, while the transfer of the load is performed by the connecting rod 52 from the lever 51 upon auxiliary beam 4. The arrangement of the auxiliary beam is the same one as described in the former construction from which the transmission of load to that borne above it is accomplished through an inclined beam 8 oscillating on either side of a horizontal middle plane by connecting rod 3. When a load is placed upon the weighbridge, the action of said load is transmitted by means of connecting rod 5 to lever 51 from which is transferred one part by means of connecting rod 3 to the inclined beam 8, the other part by means of link 53 upon lever 28. By adopting a suitable relative magnitude of the weights 31 and of the tilting weights 54 the lever 28 is prevented from yielding to the load of link 53 as long as the load of the weighbridge has not overstepped the range of scale 1. It is assumed that the extent of the scale 1 amounts to 100 kg.; the loads upon the weighbridge up to 100 kg. are announced by the scale 1 without the requisition of the suspended weights 25, as the scale 1 sets in such a way that the pointer 9 fixed in the direction of movement of the scale indicates the point of scale 1 corresponding to the load upon the weighbridge. If one now assumes that the division of the scale might be in kilograms and one desires to read off tenths of kilograms, then one arranges upon pointer 9 a vernier-scale which then also permits the reading of the tenth kilograms after the position of scale 1 to the vernier of pointer 9. When the load of the weighbridge exceeds the extent of scale 1 (this is in this case 100 kg.) the resistance of lever 28 together with the weights 31 and 54 acting upon it is overcome; the lever 28 moves downward with that end on which hangs the guide 29 with the weights 25 until the number of weights 25 corresponding to the load of the weighbridge are suspended from auxiliary beam 4. If the load of the weighbridge amounts in this case to between 100 and 200 kgs., the movement of lever 28 goes so far that only one weight 25 is suspended on the auxiliary beam 4, in which case the next weights 31 and 54 stop the lever 28 until the effect of the load of the suspending link 53 overcomes the weight according to the next grade; there are here 200 kgs. upon the weighbridge and so on until the entire weighing capacity is reached. The tilting weights 54 serve especially, therefore, to prevent the stopping of the initiated movement of lever 28 and also to continue the movement after the suspension of the weights 25 on the auxiliary beam 4 up to the impact against the next weight 31. For this purpose there are suspended counterweights below on the lowest part of the tilting weights 54, which neutralize at the right moment, the action of the upper weights by being taken along with the upper ones. Owing to this operation the effect of load upon the inclined beam 8 can never far surpass the extent of scale 1, because a suspension weight 25 is then always hanging on auxiliary beam 4, as soon as the grade of the extent of the scale is exceeded. By the movement of lever 28 is also moved the scale 11 and is guided by the aid of lever 35, whereby the values of the weight of the suspended weights 25 are indicated and the scale 1 sets every time in that proportion of weight, which exceeds that indicated by scale 11, but is still within the limit to the next suspending weight 25, so that in this case, if the weighbridge is charged with a load of 415, 6 kg., scale 11 will indicate 400 kg. of this load, and the scale 1, 15, 6 kg. of the said load. The weights 31, which hang on fixed supports 30, act directly upon the lever 28, while the link-work 27 serves as a retarding device with its piston 55 in cylinder 51 in order to prevent a too rapid movement of lever 28.

The retarder in Fig. 2 is just like that in Fig. 8, and consists in a shallow vessel 57 which is filled with a slowly evaporating fluid (glycerin and the like) to a suitable extent into which dives a stiff plate 58 fastened to the shaft of arm 8 and possessing a slight space for play. Under certain circumstances air can also be employed.

In order to prevent repeated oscillations of the scale 1 and printing frame 10, leaf springs are provided, as shown in Fig. 2 of the drawings.

What is claimed is:

1. A weighing machine having an oscillatory indicating scale, a stationary pointer coöperative with said scale and coacting with the latter in reading results, the latter and the pointer having printing characters, and means to move the scale against a record receiving device to produce an impression.

2. A weighing machine having a platform, a beam mechanism for supporting the platform, a plurality of scales having printing characters connected with and operable by the beam mechanism, means for automatically operating the scales to indicate the weight, and means for operating the scales to secure an impression of the printing characters carried thereby.

3. A weighing machine having a platform, beam mechanism for supporting the platform, an auxiliary beam coöperative with said beam mechanism, a plurality of weights, a carrier for supporting said weights, and connections between the carrier and the beam mechanism for causing the descent of the carrier on the descent of the platform, and the successive support of said weights by said auxiliary beam.

4. A weighing machine having a platform, beam mechanism for supporting the platform, an auxiliary beam, a connecting member between said beam mechanism and auxiliary beam, a carrier coöperative with the beam mechanism and having structural means and arrangement to cause it to descend on the descent of the platform, the weights being arranged to be successively supported by the auxiliary beam on the descent of the platform, and a plurality of weights adapted to be successively picked up by said connecting member as the same rises.

5. A weighing machine having beam mechanism, a platform supported by the beam mechanism, a registering device operable on each complete movement of the platform, and mechanism controlled by the platform for preventing the action of the registering device until the platform has made a complete movement.

In testimony whereof I have hereunto set my hand in presence of two subscribing witnesses.

ANTON MICHEL.

Witnesses:
  JOSEF RUBARCH,
  ALVESTO S. HOGUE.